US009575650B2

(12) United States Patent  
Brinda et al.

(10) Patent No.: US 9,575,650 B2
(45) Date of Patent: Feb. 21, 2017

(54) MOBILE COMMUNICATIONS DEVICE, NON-TRANSITORY COMPUTER-READABLE MEDIUM AND METHOD OF SWITCHING SCREEN OF MOBILE COMMUNICATIONS DEVICE FROM SCREEN LOCKED STATE TO SCREEN UNLOCKED STATE

(71) Applicant: HTC Corporation, Taoyuan, Taoyuan County (TW)

(72) Inventors: David Brinda, Bellevue, WA (US); Matthew John Barthelemy, Bellevue, WA (US); Drew Bamford, Bellevue, WA (US); Jason Edward Short, Bellevue, WA (US)

(73) Assignee: HTC Corporation, Taoyuan (TW)

( * ) Notice: Subject to any disclaimer, the term of this patent is extended or adjusted under 35 U.S.C. 154(b) by 154 days.

(21) Appl. No.: 14/046,694

(22) Filed: Oct. 4, 2013

(65) Prior Publication Data

US 2014/0123078 A1    May 1, 2014

Related U.S. Application Data

(60) Provisional application No. 61/718,715, filed on Oct. 26, 2012, provisional application No. 61/750,347, filed on Jan. 8, 2013.

(51) Int. Cl.
*G06F 21/36*   (2013.01)
*G06F 3/0484*  (2013.01)
*G06F 3/0488*  (2013.01)

(52) U.S. Cl.
CPC ........... *G06F 3/0488* (2013.01); *G06F 3/0484* (2013.01); *G06F 21/36* (2013.01)

(58) Field of Classification Search
CPC .............................. G06F 3/0488; G06F 3/0485
(Continued)

(56) References Cited

U.S. PATENT DOCUMENTS 8,954,895 B1 * 2/2015 Yaksick et al. ............... 715/863
2007/0150842 A1   6/2007 Chaudhri et al.
(Continued)

FOREIGN PATENT DOCUMENTS

EP    2 383 636 A1    11/2011

OTHER PUBLICATIONS

European Office Action for Application No. 13020117.1 dated Mar. 17, 2014.

(Continued)

*Primary Examiner* — Matt Kim
*Assistant Examiner* — David Luu
(74) *Attorney, Agent, or Firm* — Birch, Stewart, Kolasch & Birch, LLP (57) ABSTRACT

A method of switching a screen of a mobile communications device from a screen locked state to a screen unlocked state is provided. The mobile communications device includes a display panel configured to display the screen that has a background section and a first section in the screen locked state. The method includes: moving the first section from a first location to a second location of the screen in the screen locked state when an screen unlocking requirement is determined to be satisfied; and keeping displaying the first section at the second location of the screen after switching the screen from the screen locked state to the screen unlocked state. A non-transitory computer-readable medium and a mobile communications device for switching a screen of the mobile communications device from a screen locked state to a screen unlocked state are also provided.

22 Claims, 8 Drawing Sheets

(58) Field of Classification Search
USPC .......................................................... 715/863
See application file for complete search history.

(56) References Cited

U.S. PATENT DOCUMENTS

| | | | |
|---|---|---|---|
| 2009/0083850 A1* | 3/2009 | Fadell | G06F 21/316 726/19 |
| 2009/0106679 A1* | 4/2009 | Anzures | G06F 3/017 715/765 |
| 2009/0156173 A1* | 6/2009 | Wang | G06F 3/048 455/412.2 |
| 2010/0159995 A1* | 6/2010 | Stallings et al. | 455/566 |
| 2010/0238176 A1* | 9/2010 | Guo | G06T 13/80 345/440 |
| 2010/0306693 A1* | 12/2010 | Brinda | G06F 3/0488 715/784 |
| 2010/0306718 A1 | 12/2010 | Shim et al. | |
| 2011/0154234 A1* | 6/2011 | Winternitz | G06F 3/04845 715/765 |
| 2011/0256848 A1 | 10/2011 | Bok et al. | |
| 2012/0182226 A1 | 7/2012 | Tuli | |
| 2013/0345980 A1* | 12/2013 | van Os | G01C 21/3626 701/538 |
| 2014/0068456 A1* | 3/2014 | Chan | G06F 9/4443 715/747 |
| 2014/0171043 A1* | 6/2014 | Gotzl et al. | 455/414.2 |
| 2014/0310643 A1* | 10/2014 | Karmanenko et al. | 715/784 |

OTHER PUBLICATIONS

European Office Action for Application No. 13020117.1 dated Nov. 24, 2014.
European Office Action for Application No. 13 020 117.1 dated Sep. 9, 2015; pp. 1-8.

* cited by examiner

MOBILE COMMUNICATIONS DEVICE, NON-TRANSITORY COMPUTER-READABLE MEDIUM AND METHOD OF SWITCHING SCREEN OF MOBILE COMMUNICATIONS DEVICE FROM SCREEN LOCKED STATE TO SCREEN UNLOCKED STATE

CROSS-REFERENCE TO RELATED APPLICATIONS

This nonprovisional application claims priority under 35 U.S.C. §119(e) on U.S. Provisional Patent Application No. 61/718,715, filed on Oct. 26, 2012 and U.S. Provisional Patent Application No. 61/750,347, filed on Jan. 8, 2013, the entirety of which is incorporated herein by reference.

BACKGROUND OF THE INVENTION

1. Field of the Invention

The present invention relates to a mobile communications device, a non-transitory computer-readable medium and a method, and more particularly to a mobile communications device, a non-transitory computer-readable medium and a method for switching a screen of a mobile communications device from a screen locked state to a screen unlocked state.

2. Background of the Invention

A recent trend in the mobile communications device industry is to implement a screen locking mechanism in a mobile communications device such as a smart phone in order to avoid or reduce the unintended actions triggered by inadvertent touches of the touch screen. When the smart phone is idle or inactive for a period of time, the phone would automatically enter into a screen locked state and thereby disable further input on the touch screen until a specific unlock mechanism is performed to resume normal operation of the touch screen and switch the screen from the screen locked state to a screen unlocked state. The aforementioned mechanism may be crucial to operability of the phone, as the touch screen may potentially rub against the fabric of the user's pocket or a backpack when the smart phone is stored in the user's pocket or the backpack, which may trigger inadvertent touches of the touch screen.

However, as the current use of the smart phone becomes more prevalent, a user may need to perform screen unlocking operations several times per day or even several times per hour. Therefore, a faster and more efficient way of performing the screen unlocking operations would be desired. Also, as a user repeatedly performs several operation of using the mobile phone, e.g., pausing the operation, performing screen unlock, and operating on the mobile phone again and again, the user may find that the transition between a locked screen and a normal operating (unlocked) screen is somewhat disruptive, as the perceived changes between interfaces experienced by a user is too stark and may cause sensory fatigue to the eyes of the user.

SUMMARY OF THE INVENTION

Accordingly, it is an object of the present invention to provide a new screen unlocking mechanism with a smooth and seamless transition from the screen locked state to the screen unlocked state, so as to be more pleasing to the eyes of the users.

To achieve the above-mentioned object, according to an aspect of the present invention, a method of switching a screen of a mobile communications device from a screen locked state to a screen unlocked state is provided. The mobile communications device comprises a display panel configured to display the screen that has a background section and a first section in the screen locked state. The method includes: moving the first section from a first location to a second location of the screen in the screen locked state when an screen unlocking requirement is determined to be satisfied; and keeping displaying the first section at the second location of the screen after switching the screen from the screen locked state to the screen unlocked state.

According to another aspect of the present invention, a non-transitory computer-readable medium containing a computer program product comprising mobile communications device executable instructions for switching a screen of a mobile communications device from a screen locked state to a screen unlocked state is provided. The mobile communications device comprises a display panel configured to display the screen that has a background section and a first section in the screen locked state. The mobile communications device executable instructions comprises: moving the first section from a first location to a second location of the screen in the screen locked state when an screen unlocking requirement is determined to be satisfied; and keeping displaying the first section at the second location of the screen after switching the screen from the screen locked state to the screen unlocked state.

According to still another aspect of the present invention, a mobile communications device comprises: a display panel configured to display a screen; and a processor connected to the display panel and configured to switch the screen from a screen locked state to a screen unlocked state, wherein the screen has a background section and a first section in the screen locked state, wherein the processor is further configured to cooperate with the display panel to: move the first section from a first location to a second location of the screen in the screen locked state when an screen unlocking requirement is determined to be satisfied; and keep displaying the first section at the second location of the screen after switching the screen from the screen locked state to the screen unlocked state.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

The present invention will now be described in detail with reference to the accompanying drawings, wherein the same reference numerals will be used to identify the same or similar elements throughout the several views. It should be noted that the drawings should be viewed in the direction of orientation of the reference numerals.

Figure 1:
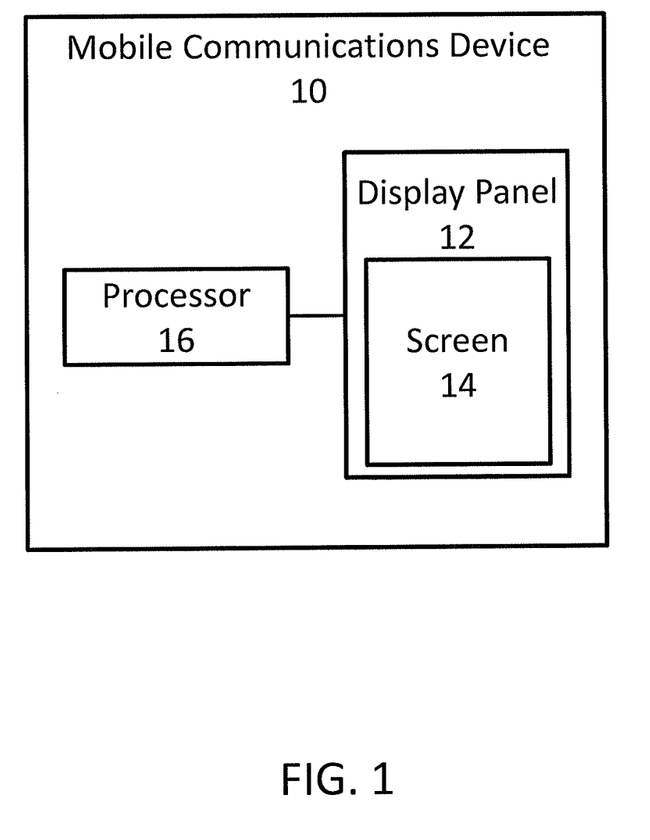
FIG. 1 illustrates a block diagram of a mobile communications device in accordance with an exemplary embodiment of the present invention.

FIG. 1 illustrates a block diagram of a mobile communications device in accordance with an exemplary embodiment of the present invention. As embodied in FIG. 1, the mobile communications device 10 includes a display panel 12 configured to display a screen 14, and a processor 16 connected to the display panel 12 and configured to switch the screen from a screen locked state to a screen unlocked state, wherein the screen 14 has a background section and a first section in the screen locked state.

Figure 2:
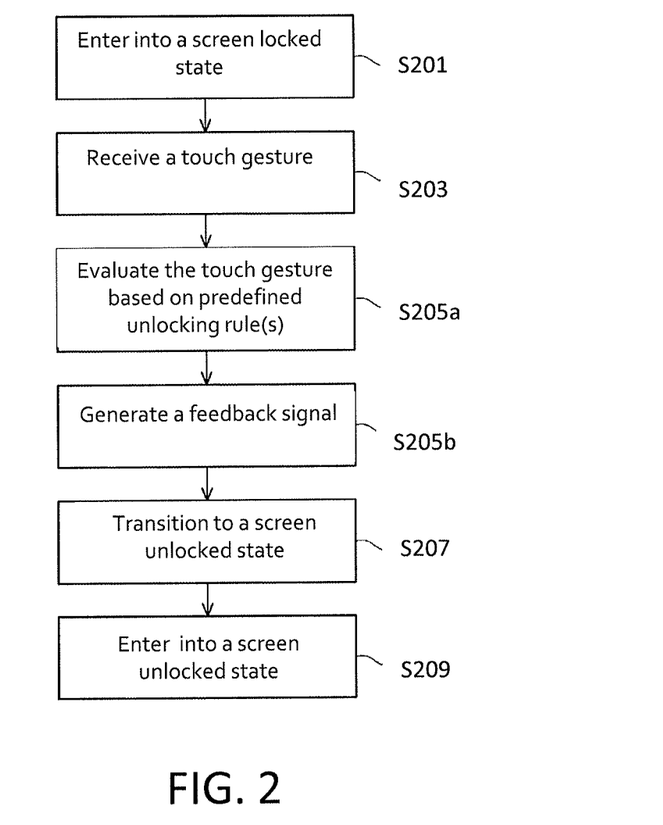
FIG. 2 is a flow chart illustrating a screen unlocking procedure in accordance with an exemplary embodiment of the present invention.

FIG. 2 is a flow chart illustrating a screen unlocking procedure in accordance with an exemplary embodiment of the present invention. In step S201, the screen enters into a screen locked state from a user interface of a previous application, and further input to the user interface of the previous application is prohibited unless the screen is switched from the screen locked state to screen unlocked state, such that no inadvertent touches would disturb the previous application. In step S203, an input gesture is received from the touch screen. In an exemplary embodiment, the input gesture refers to user input actions such as a slide, a tap, a drag, a long press, and so forth. In step S205a, the input gesture received from the touch screen is compared against one or more predefined unlocking rules, which are, for example, but not limited to, based on the velocity of the input gesture relative to the touch screen. In response to step S205a, the touch screen would at the same time generate a feedback signal in step S205b in order to inform the user of the progress of the screen unlocking operation. In step S207, if the touch gesture satisfies the one or more predefined unlocking rules, the mobile communications device is switched to the screen unlocked state. After switched to the screen unlocked state, the screen of the mobile communications device may either return back to the previous application from which the screen locked state enters from, or the screen of the mobile communications device may enter into a home screen.

The steps as illustrates in the exemplary embodiment shown in FIG. 2 could be further illustrated below. In step S201, a mobile communications device with a touch screen enters into a screen locked state upon the initiation of a user or after a period of inactivity, and the mobile communications device is for example a smart phone. In step S203, the touch screen of the smart phone receives an input signal, which includes a touch signal followed by an upward swipe on the touch screen. Next, in step S205a the upward swipe signal is to be evaluated according to one or more predetermined rules which will be explained later. In step S205b, as the input gesture of step S205a is being evaluated, a feedback to the user is generated on the touch screen in order to inform the user of the detection of the input gesture and the progress of the screen unlocking mechanism. In step S207, if that the one or more predetermined unlocking rules are satisfied, the touch screen would transition from the screen locked state to a screen unlocked state. More specific descriptions of step S207 will be explained later. In S209, the screen of the smart phone is switched to the screen unlocked state after the transition is complete.

Figure 3:
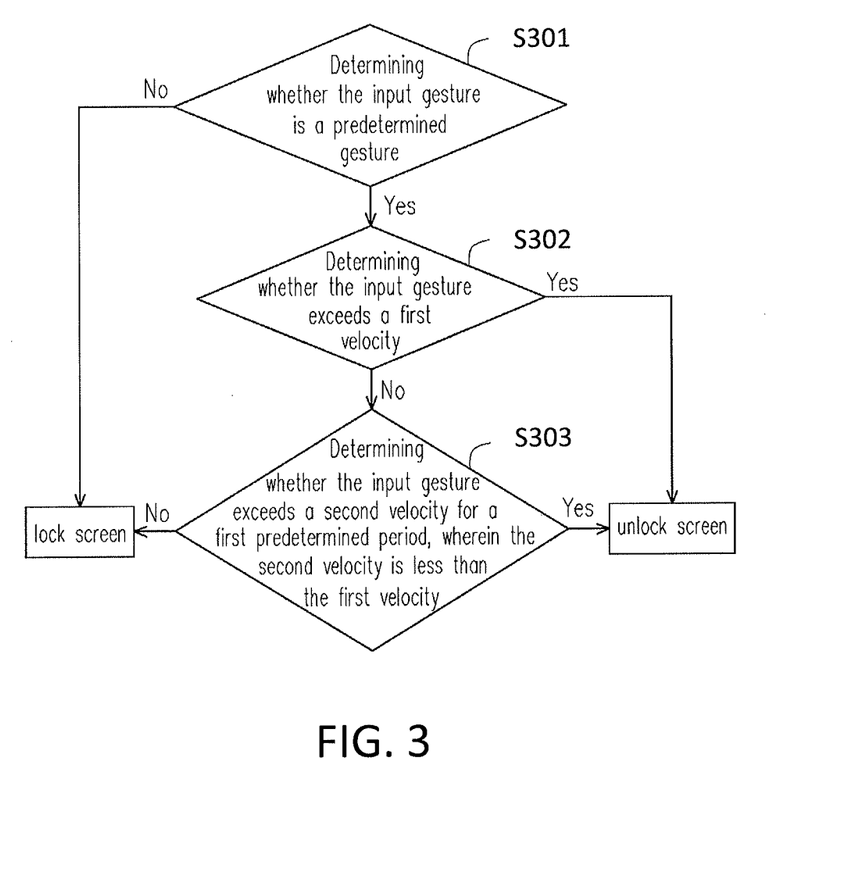
FIG. 3 is a flow chart illustrating how to evaluate a touch gesture based on one or more predefined unlocking rules in accordance with an exemplary embodiment of the present invention.

FIG. 3 is a flow chart illustrating how to evaluate a touch gesture based on one or more predefined unlocking rules in accordance with an exemplary embodiment of the present invention. In steps S301, a mobile communications device such as a smart phone determines whether an input gesture matches a predetermined gesture. In an exemplary embodiment, the predetermined gesture can be an upward touch and swipe motion. If the predetermined gesture is not met, then the screen would remain locked, since the touch could be deemed as an inadvertent touch. If the input gesture matches the predetermined gesture, then in step S302, the smart phone determines whether the input touch and swipe exceeds a first velocity. If the first velocity is exceeded, then the screen is unlocked (i.e., the screen is switched from the screen locked state to the screen unlocked state). If the first velocity is not exceeded, then in step S303, the smart phone determines whether the input gesture exceeds a second velocity for a first predetermined period. It should be noted that the second velocity is less than the first velocity. If the second velocity is exceeded for a first predetermined period, the screen is switched from the screen locked state to a screen unlocked state; otherwise, the touch screen remains locked.

In an exemplary embodiment, the first velocity could be set as 2000 pixels per second, which has been determined as an optimal velocity accurately reflecting a user's intention, the second velocity could be set as 300 pixels per second, and the first predetermined period could be set as 0.3 second. In this exemplary embodiment, if a user performs a touch and swipe upward gesture with a velocity of 2000 pixels or higher per second, then the screen is unlocked. However, if the input gesture is below 2000 pixels per second but is above 300 pixels per second for more than 0.3 second, the screen is also unlocked. If the input gesture falls below 300 pixels per second, or is below 2000 pixels per second but is above 300 pixels for less than 0.3 second, then it is determined that it is a spurious or inadvertent touch and the screen remains locked.

In order to provide a seamless transition for switching a screen of a mobile communications device from a screen locked state to a screen unlocked state, as embodied in the present invention, the mobile communications device comprises a display panel configured to display the screen that has a background section and a first section in the screen locked state. The first section is moved from a first location to a second location of the screen in the screen locked state when a screen unlocking requirement is determined to be satisfied. In addition, the first section keeps displayed at the second location of the screen after the screen is switched from the screen locked state to the screen unlocked state.

In an exemplary embodiment, the first section keeps displayed on the screen before, during and after switching the screen from the screen locked state to the screen unlocked state. In an exemplary embodiment, the size of the first section keeps unchanged before, during and after switching the screen from the screen locked state to the screen unlocked state. In an exemplary embodiment, the first section keeps displayed on the screen during the movement of the first section from a first location to a second location of the screen. In an exemplary embodiment, the size of the first section keeps unchanged during the movement of the first section from the first location to the second location of the screen. In an exemplary embodiment, the replacing process of the background section with the second section is performed when the screen unlocking requirement is determined to be satisfied. In an exemplary embodiment, the first section keeps displayed on the screen during the replacing process. In an exemplary embodiment, the size of the first section keeps unchanged during the replacing process. In an exemplary embodiment, the process of replacing the background section with the second section includes replacing the background section with the second section at least during the movement of the first section from the first location to the second location of the screen. In an exemplary embodiment, the screen of the mobile communications device is completely switched from the screen locked state to the screen unlocked state upon completion of the replacing process. In an exemplary embodiment, whether the screen unlocking requirement is satisfied is determined based on a speed and a time period of an input gesture. In an exemplary embodiment, the screen unlocking requirement is satisfied when an input gesture exceeds a first predetermined speed, or when the input gesture does not exceed the first predetermined speed but exceeds a second predetermined speed for a predetermined time period.

In an exemplary embodiment, a processor of the mobile communications device is configured to cooperate with the display panel to perform this process. In another exemplary embodiment, a non-transitory computer-readable medium (e.g., a memory device in the mobile communications device/processor or an external memory device accessible by the mobile communications device/processor) containing a computer program product comprising mobile communications device executable instructions can be executed by the mobile communications device for switching a screen of a mobile communications device from a screen locked state to a screen unlocked state.

Figure 4:
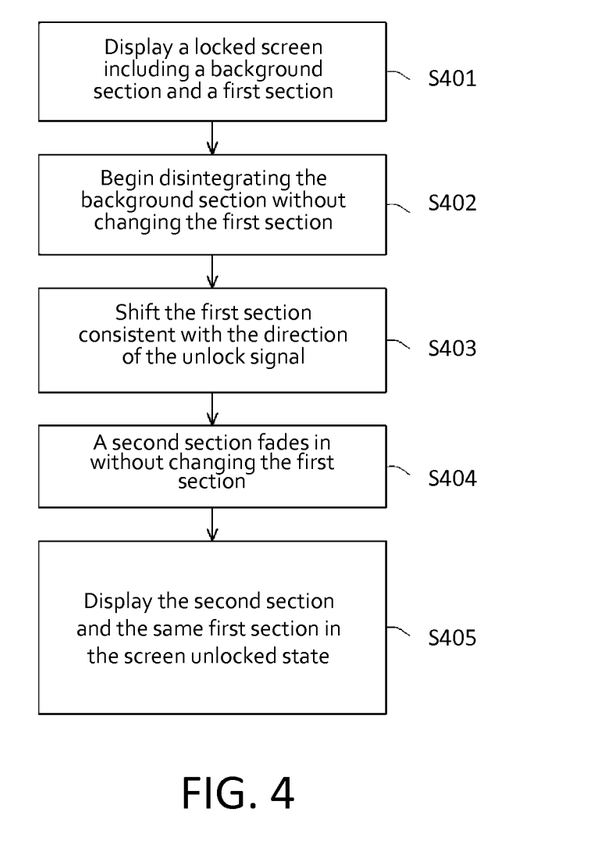
FIG. 4 is a flow chart illustrating a seamless transition from a locked screen to an unlocked screen in accordance with an exemplary embodiment of the present invention.

FIG. 4 is a flow chart illustrates a seamless transition from a screen locked state to a screen unlocked screen in accordance with an exemplary embodiment of the present invention. In step S401, the screen of a mobile communications device such as a smart phone is in the screen locked state. The locked screen includes a background section and a first section. In an exemplary embodiment, the first section for example can be a feed section displaying various feeds from external servers or from an internal storage device. In an exemplary embodiment, the background section can be a background photo, an animation, a video clip, a representative of an interface of an application, and so forth. In an exemplary embodiment, the feed section can display data from an external server such as a weather information, new information, social network updates, emails, messengers, etc. In another exemplary embodiment, the feed section can also display information local to the hard drive such as calendars for instance. In step S402, the background section begins disintegrating and fading out while the first section remains unchanged. In step S403, while the background section is fading out, the first section is moved toward the direction basically consistent with the direction of the input gesture and remains unchanged in the illustrated exemplary embodiment. In step S404, a second section is fading in and re-assembling on a pixel by pixel basis while the first section remains unchanged. In step S405, the second section has completely replaced the background section as the screen is in the screen unlocked state, while the first section remains displayed with the second section on the screen but has been shifted from an original location in the screen locked state to a different location in the screen unlocked state. In an exemplary embodiment, if the input gesture is a touch and upward swipe, the first section will be moved to an upward position. In an exemplary embodiment, the second section can be a user interface of a home screen, a user interface of an application from which the screen entered into the screen locked state, etc.

Figure 5A:
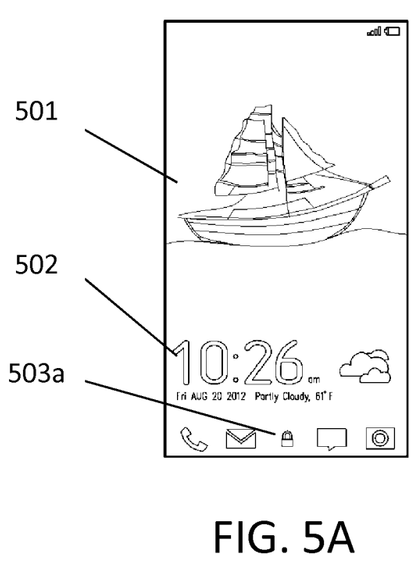
FIGS. 5A-5E illustrate a screen unlocking process in accordance with an exemplary embodiment of the present invention.
Figure 5B:
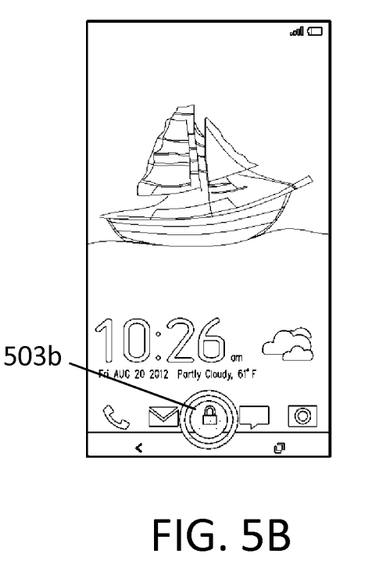
Figure 5C:
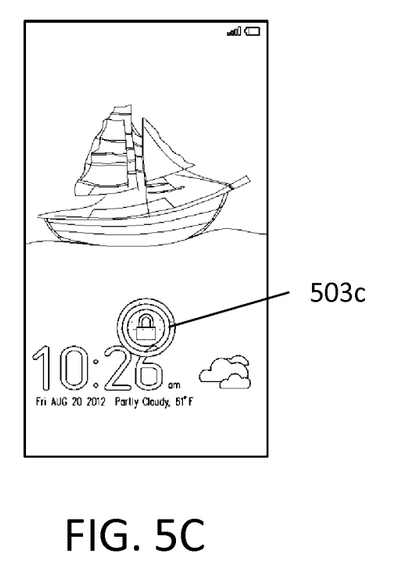
Figure 5D:
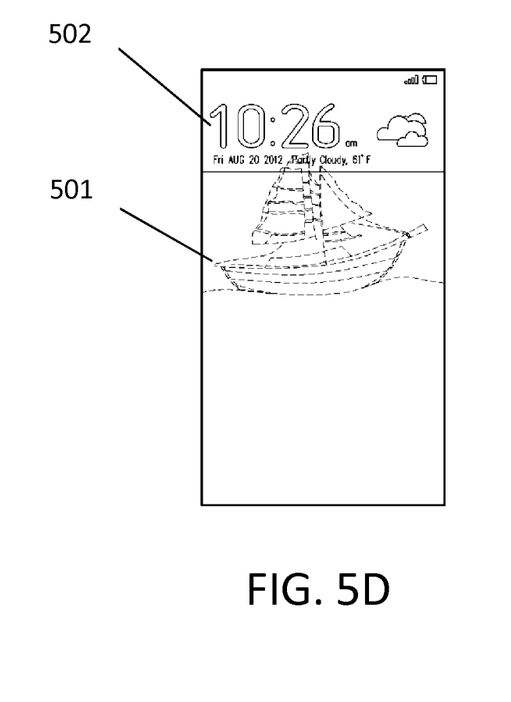
Figure 5E:
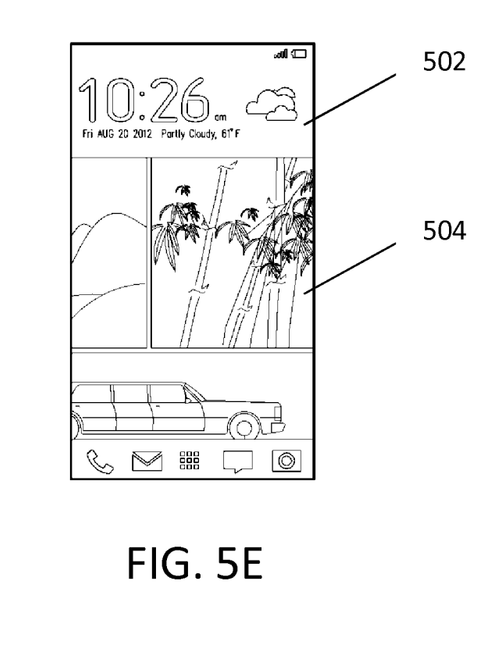

FIGS. 5A-5E illustrates a screen unlocking process in accordance with an exemplary embodiment of the present application. FIG. 5A illustrates an example of a display panel of a mobile communications device (such as a smart phone) displaying a screen while it is in the screen locked state. In the illustrated exemplary embodiment, the screen in the screen locked state displays a background section 501 and a first section 502 such as a feed section, and the bottom of the screen displays an application icon panel which includes a screen lock icon 503a. The principle of operation is similar to what has been described above. In the illustrated exemplary embodiment, when a user performs an upward swipe motion in FIG. 5B, the screen lock icon 503a becomes a highlighted screen lock icon 503b, which is different from the screen lock icon 503a. As the input gesture moves upwards, the highlighted screen lock icon 503b may become a further different highlighted screen lock icon 503c as shown in FIG. 5C. In an exemplary embodiment, the highlighted screen lock icon 503c could be different in size, shape, or color from the highlighted screen lock icon 503b and/or the screen lock icon 503a. The different highlighted screen lock icon 503c could accurately reflect the location of the current touch signal or reflect the direction of the touch signal. It should be noted that in one exemplary embodiment, a user can perform an upward motion from anywhere on the touch screen. In another exemplary embodiment, a user can perform an upward motion starting from the screen lock icon 503a. In FIG. 5D, when the one or more screen unlocking rules have been satisfied, the feed section 502 is moved to an upper location consistent with the direction of the touch and swipe signal, and the background section 501 begins to fade out. FIG. 5E illustrates the aftermath of the transitioning process. The second section 504 emerges and fades in as the background section 501 fades out. It should be noted that the feed section 502 remains displayed with the second section 504 on the screen, although the location of the feed section 502 has been moved from its original location in the screen locked state to a different location in the screen unlocked state.

In the exemplary embodiment as illustrated in FIGS. 5A-5E, the first section (e.g., the feed section) 502 keeps displayed on the screen before, during and after switching the screen from the screen locked state to the screen unlocked state, and the size of the first section (e.g., the feed section) 502 keeps unchanged before, during and after switching the screen from the screen locked state to the screen unlocked state. More specifically, the first section (e.g., the feed section) 502 keeps displayed on the screen during the movement of the first section (e.g., the feed section) 502 from a first location (e.g., the lower location in FIG. 5A) to a second location (e.g., the upper location in FIGS. 5D and 5E) of the screen, and the size of the first section (e.g., the fee section) 502 keeps unchanged during the movement of the first section (e.g., the feed section) 502 from the first location (e.g., the lower location in FIG. 5A) to the second location (e.g., the upper location in FIGS. 5D and 5E) of the screen. In addition, the replacing process of the background section with the second section 504 (e.g., the second section 504 fades in as the background section 501 fades out) is performed when the screen unlocking requirement is determined to be satisfied, the first section (e.g., the feed section) 502 keeps displayed on the screen during the replacing process, and the size of the first section (e.g., the fee section) 502 keeps unchanged during the replacing process. The process of replacing the background section 501 with the second section 504 includes replacing the background section 501 with the second section 504 at least during the movement of the first section (e.g., the feed section) 502 from the first location (e.g., the lower location in FIG. 5A) to the second location (e.g., the upper location in FIGS. 5D and 5E) of the screen, and the replacing process may continue even after the first section (e.g., the feed section) 502 reaches the second location (e.g., the upper location in FIG. 5D) of the screen. In the exemplary embodiment as illustrated in FIGS. 5A-5E, the screen of the mobile communications device is completely switched from the screen locked state to the screen unlocked state upon completion of the replacing process.

One of the purposes of the present invention is to provide the user with a natural feel of the locked screen and a smooth and seamless transition process from the screen locked state to the screen unlocked state. The user may not even feel that the screen has been locked. In the illustrated exemplary embodiment, when the screen unlocking process is performed, the background section is transformed into the second section in a seamless way as the feed section is moved forward, which breaks the boundaries of the screen locked state and the screen unlocked state. This means that there are no visible boundaries between the screen locked state and the screen unlocked state, because the background section 501 has been seamlessly transformed into or replaced by the second section 504, and the feed section 502 keeps displayed before, during and after switching the screen from the screen locked state to the screen unlocked state.

Figure 6A:
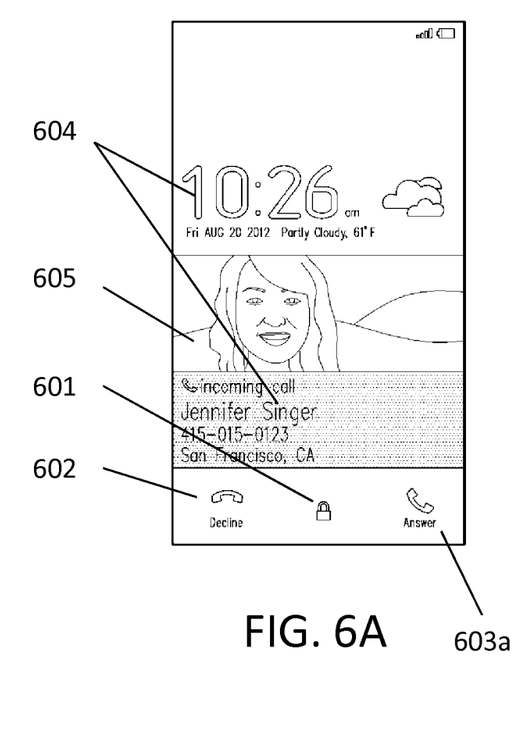
FIGS. 6A-6F illustrate a screen unlocking process during an incoming call in accordance with an exemplary embodiment of the present invention.
Figure 6B:
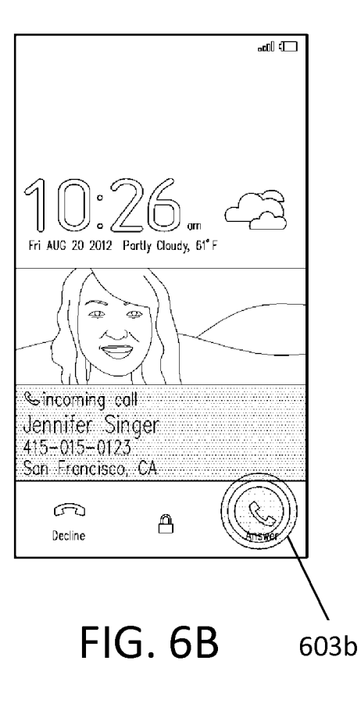
Figure 6C:
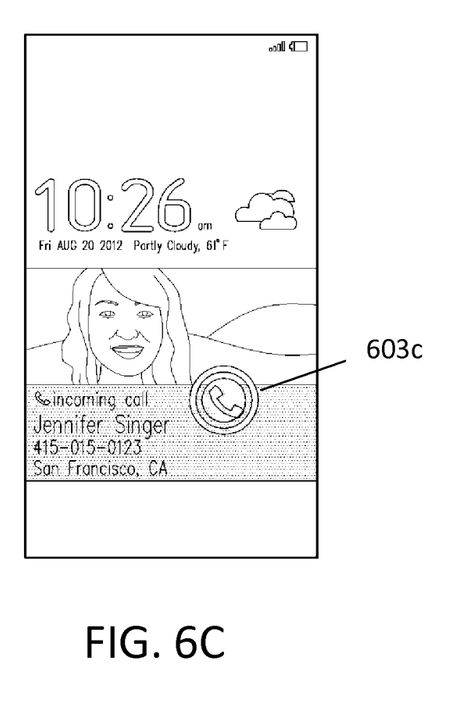
Figure 6D:
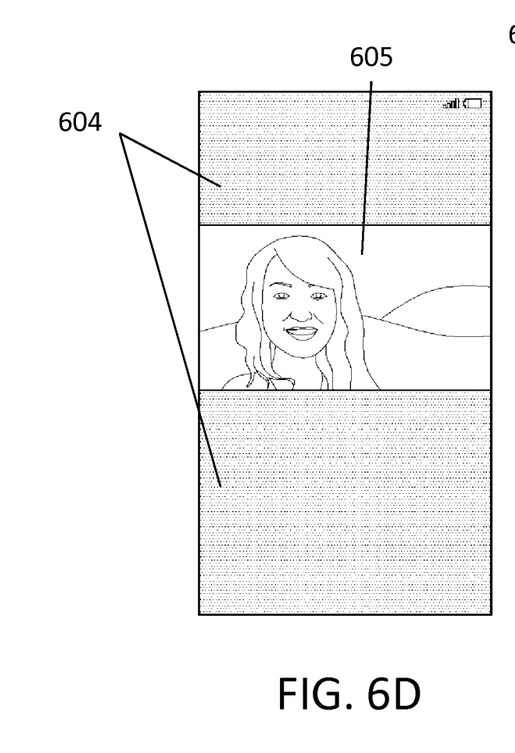
Figure 6E:
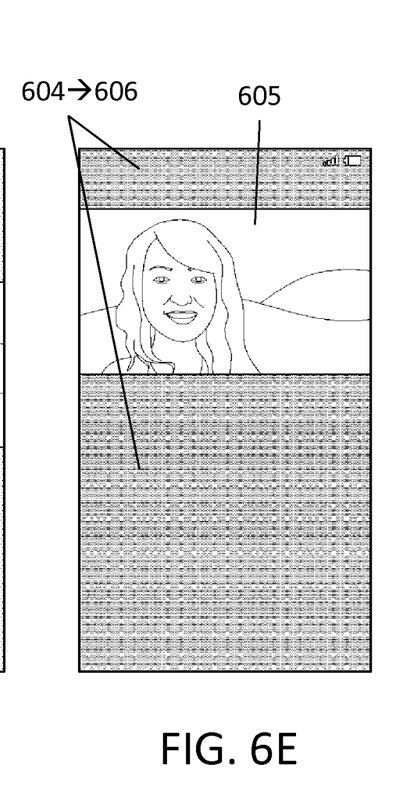
Figure 6F:
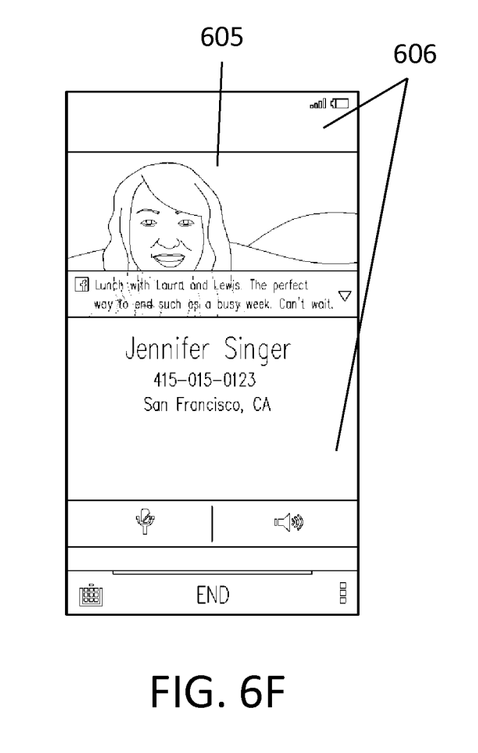

FIGS. 6A-6F illustrate a screen unlocking process during an incoming call in accordance with an exemplary embodiment of the present invention. FIG. 6A illustrates a display panel of a mobile communications device (such as a smart phone) displaying a screen while it is in the screen locked state during an incoming call, and the screen displays a background section 604, a first section 605 (such as a photo as shown in FIG. 6A), a screen lock indicator 601, an answer button 603a and a decline icon 602. In one exemplary embodiment, if the user refuses to take the incoming call, the user may press the decline button 602; if the user accepts the incoming call, the user may simply press the answer button 603a. In another exemplary embodiment, if the user accepts the incoming call, the user may perform a screen unlocking procedure similar to the aforementioned procedure as shown in FIGS. 5A-5E. In FIG. 6B, the user responds to the incoming call by gesturing with an upward swipe on the touch screen. Upon receiving the input signal, the touch screen highlights the answer button 603b. In FIG. 6C, as the user continues the unlocking procedure, the answer button of 603b could become a further different highlighted answer button 603c with a different size, shape, color, or representative image. Next, when the one or more screen unlocking rules have been satisfied, then in FIG. 6D, the background section 604 begins to disintegrate. In FIG. 6E, a second section 606 begins to fade in. FIG. 6F shows the aftermath of the screen unlocking process. The second section 606 in FIG. 6F has completed the fading in process and replaced the original background section 604 in the screen locked state.

It should be noted that the first section 605 (e.g., the photo in the illustrated exemplary embodiment) remains displayed before, during and after the screen is switched from the screen locked state to the screen unlocked state, although the location of the first section 605 has been moved from its original location in the screen locked state to a different location in the screen unlocked state. This provides the user with a smooth and seamless transition process from the screen locked state to the screen unlocked state.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of switching a screen of a mobile communications device from a screen locked state to a screen unlocked state, the mobile communications device comprising a display panel configured to display the screen that has a background section and a first section in the screen locked state, the first section displaying information with a first layout, the method comprising:
    moving the first section from a first location to a second location of the screen in the screen locked state when a screen unlocking requirement is determined to be satisfied; and
    keeping displaying the first section at the second location of the screen after switching the screen from the screen locked state to the screen unlocked state;
    keeping displaying the first section on the screen before, during and after switching the screen from the screen locked state to the screen unlocked state; and
    keeping a size of the first section unchanged before, during and after switching the screen from the screen locked state to the screen unlocked state,
    wherein the first section, in its entirety, is moved from the first location to the second location without changing the first layout of the information displayed in the first section, and
    wherein the first section is moved from the first location to the second location in a similar direction to that of an input gesture for satisfying the screen unlocking requirement for switching the screen from the screen locked state to the screen unlocked state.

2. The method of claim 1, further comprising replacing the background section with a second section when the screen unlocking requirement is determined to be satisfied.

3. The method of claim 2, wherein the screen of the mobile communications device is completely switched from the screen locked state to the screen unlocked state upon completion of the replacing step.

4. The method of claim 1, wherein whether the screen unlocking requirement is satisfied is determined based on a speed and a time period of the input gesture.

5. A non-transitory computer-readable medium containing a computer program product comprising mobile communications device executable instructions for switching a screen of a mobile communications device from a screen locked state to a screen unlocked state, the mobile communications device comprising a display panel configured to display the screen that has a background section and a first section in the screen locked state, the first section displaying information with a first layout, the mobile communications device executable instructions comprising:

moving the first section from a first location to a second location of the screen in the screen locked state when a screen unlocking requirement is determined to be satisfied;

keeping displaying the first section at the second location of the screen after switching the screen from the screen locked state to the screen unlocked state;

keeping displaying the first section on the screen before, during and after switching the screen from the screen locked state to the screen unlocked state; and keeping a size of the first section unchanged before, during and after switching the screen from the screen locked state to the screen unlocked state, wherein the first section, in its entirety, is moved from the first location to the second location without changing the first layout of the information displayed in the first section, and wherein the first section is moved from the first location to the second location in a similar direction to that of an input gesture for satisfying the screen unlocking requirement for switching the screen from the screen locked state to the screen unlocked state.

6. A mobile communications device comprising:

a display panel configured to display a screen; and a processor connected to the display panel and configured to switch the screen from a screen locked state to a screen unlocked state, wherein the screen has a background section and a first section in the screen locked state, the first section displaying information with a first layout, wherein the processor is further configured to cooperate with the display panel to:

move the first section from a first location to a second location of the screen in the screen locked state when a screen unlocking requirement is determined to be satisfied; and keep displaying the first section at the second location of the screen after switching the screen from the screen locked state to the screen unlocked state, wherein the first section, in its entirety, is moved from the first location to the second location without changing the first layout of the information displayed in the first section, wherein the processor is further configured to cooperate with the display panel to keep displaying the first section on the screen before, during and after switching the screen from the screen locked state to the screen unlocked state, and to keep a size of the first section unchanged before, during and after switching the screen from the screen locked state to the screen unlocked state, and wherein the first section is moved from the first location to the second location in a similar direction to that of an input gesture for satisfying the screen unlocking requirement for switching the screen from the screen locked state to the screen unlocked state.

7. The mobile communications device of claim 6, wherein the processor is further configured to cooperate with the display panel to keep displaying the first section on the screen during movement of the first section form the first location to the second location of the screen in the screen locked state.

8. The mobile communications device of claim 7, wherein the processor is further configured to cooperate with the display panel to keep a size of the first section unchanged during the movement of the first section from the first location to the second location of the screen in the screen locked state.

9. The mobile communications device of claim 6, wherein the processor is further configured to cooperate with the display panel to replace the background section with a second section when the screen unlocking requirement is determined to be satisfied.

10. The mobile communications device of claim 9, wherein the processor is further configured to cooperate with the display panel to keep displaying the first section on the screen during replacement of the background section with the second section.

11. The mobile communications device of claim 10, wherein the processor is further configured to cooperate with the display panel to keep a size of the first section unchanged during the replacement of the background section with the second section.

12. The mobile communications device of claim 9, wherein the processor is further configured to cooperate with the display panel to replace the background section with the second section at least during movement of the first section from the first location to the second location of the screen in the screen locked state.

13. The mobile communications device of claim 12, wherein the processor is further configured to cooperate with the display panel to make the second section fade in as the background section fades out, thereby replacing the background section with the second screen.

14. The mobile communications device of claim 9, wherein the screen of the mobile communications device is completely switched from the screen locked state to the screen unlocked state upon completion of replacement of the background section with the second section.

15. The mobile communications device of claim 6, wherein the screen unlocking requirement is satisfied when the input gesture exceeds a first predetermined speed, or when the input gesture does not exceed the first predetermined speed but exceeds a second predetermined speed for a predetermined time period.

16. The mobile communications device of claim 6, wherein whether the screen unlocking requirement is satisfied is determined based on a speed and a time period of the input gesture.

17. The method of claim 1, wherein the background section includes an answer icon for an user to answer an incoming call, and the first section displays an image of an caller of the incoming call, and wherein the method further comprises:

changing at least one of a size, a shape, a color, a representative image and a location of the answer icon in response to an input gesture from the user for answering the incoming call; and in response to the screen unlocking requirement being determined to be satisfied, transitioning the background section into a second section, different from the background section, and moving the first section from the first location to the second location of the screen.

18. The non-transitory computer-readable medium of claim 5, wherein the background section includes an answer icon for an user to answer an incoming call, and the first section displays an image of an caller of the incoming call, and wherein the mobile communications device executable instructions further comprise:

changing at least one of a size, a shape, a color, a representative image and a location of the answer icon in response to an input gesture from the user for answering the incoming call; and in response to the screen unlocking requirement being determined to be satisfied, transitioning the background section into a second section, different from the background section, and moving the first section from the first location to the second location of the screen.

19. The mobile communications device of claim 6, wherein the background section includes an answer icon for an user to answer an incoming call, and the first section displays an image of an caller of the incoming call, and
wherein the processor is further configured to cooperate with the display panel to:
change at least one of a size, a shape, a color, a representative image and a location of the answer icon in response to an input gesture from the user for answering the incoming call; and
in response to the screen unlocking requirement being determined to be satisfied, transition the background section into a second section, different from the background section, and moving the first section from the first location to the second location of the screen.

20. The method of claim 1, wherein during the movement of the first section, the background section is disintegrated without changing the first section, and a second section fades in to replace the background section without changing the first section.

21. The non-transitory computer-readable medium of claim 5, wherein during the movement of the first section, the background section is disintegrated without changing the first section, and a second section fades in to replace the background section without changing the first section.

22. The mobile communications device of claim 6, wherein during the movement of the first section, the background section is disintegrated without changing the first section, and a second section fades in to replace the background section without changing the first section.

* * * * *